(12) United States Patent
Akiyama

(10) Patent No.: US 6,636,346 B2
(45) Date of Patent: Oct. 21, 2003

(54) OPTICAL AMPLIFIER AND OPTICALLY AMPLIFYING METHOD

(75) Inventor: Kouiti Akiyama, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 10/023,496

(22) Filed: Dec. 17, 2001

(65) Prior Publication Data

US 2002/0080470 A1 Jun. 27, 2002

(30) Foreign Application Priority Data

Dec. 22, 2000 (JP) .......................... 2000-391578

(51) Int. Cl.$^7$ ................................. H01S 3/00
(52) U.S. Cl. ..................... 359/341.33; 359/341.41
(58) Field of Search .................... 359/341.33, 341.41

(56) References Cited

U.S. PATENT DOCUMENTS 5,995,275 A * 11/1999 Suagaya ................. 359/341

FOREIGN PATENT DOCUMENTS

| EP | 1170838 A1 | * 9/2002 |
|---|---|---|
| JP | 4-096287 | 3/1992 |
| JP | 6-308548 | 11/1994 |
| JP | 7-038187 | 2/1995 |
| JP | 8-250785 | 9/1996 |
| JP | 8-250790 | 9/1996 |
| JP | 10-084152 | 3/1998 |
| JP | 11-112434 | 4/1999 |

OTHER PUBLICATIONS

Seikai et al, "Experimental Studies on Wavelength Division Bidirectional Optical Amplifiers Using an Er 3+—Doped Fiber" (1994), IEEE Journal of Lightwave Technology, vol. 12, No. 5 pp 849–853.*
Karasek, "Design of gain shifted erbium–doped fibre amplifiers for WDM applications" (1999), IEE proceeds optoelectronics, vol. 146, pp 143–148.*
Japanese Office Action issued Feb. 18, 2003 (w/English translation of relevant portion).

* cited by examiner

Primary Examiner—Mark Hellner
(74) Attorney, Agent, or Firm—Dickstein, Shapiro, Morin & Oshinsky LLP

(57) ABSTRACT

Disclosed is an optical amplifier, comprising: at least one optically amplifying unit having: a forward excitation light source for generating a forward excitation light; a forward excitation light coupler for coupling the forward excitation light with an input optical signal; an optically amplifying medium for amplifying the input optical signal combined with the forward excitation light; a backward excitation light source for generating a backward excitation light; a backward excitation light coupler for coupling the backward excitation light with the amplified optical signal; a first controller for controlling the forward excitation light source to generate the forward excitation light with a power up to a maximum power thereof; and a second controller for controlling the backward excitation light source to generate the backward excitation light in such a way that the backward excitation light compensates gain deficiency as compared with a desired gain of the optical amplifier.

9 Claims, 7 Drawing Sheets

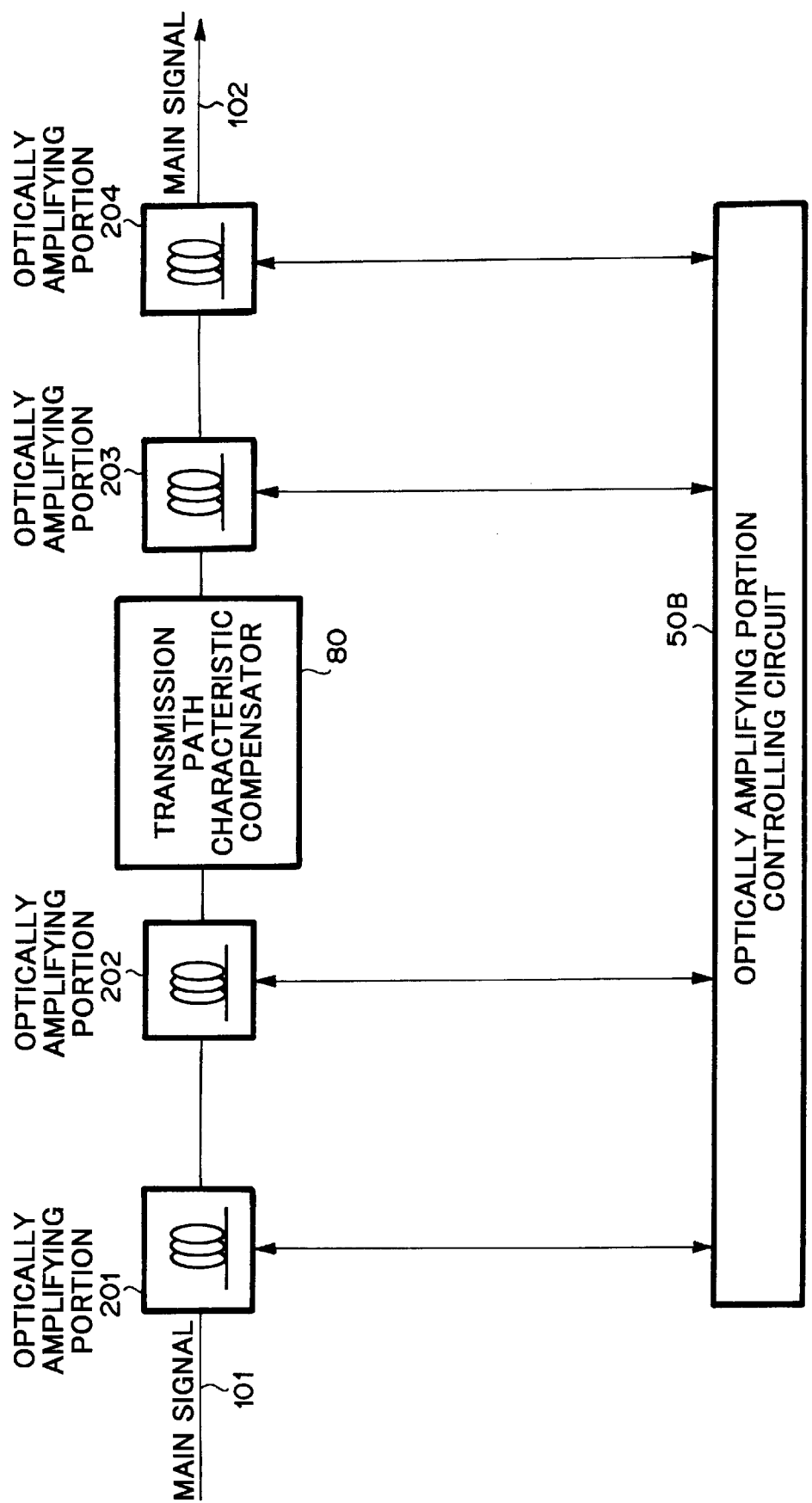

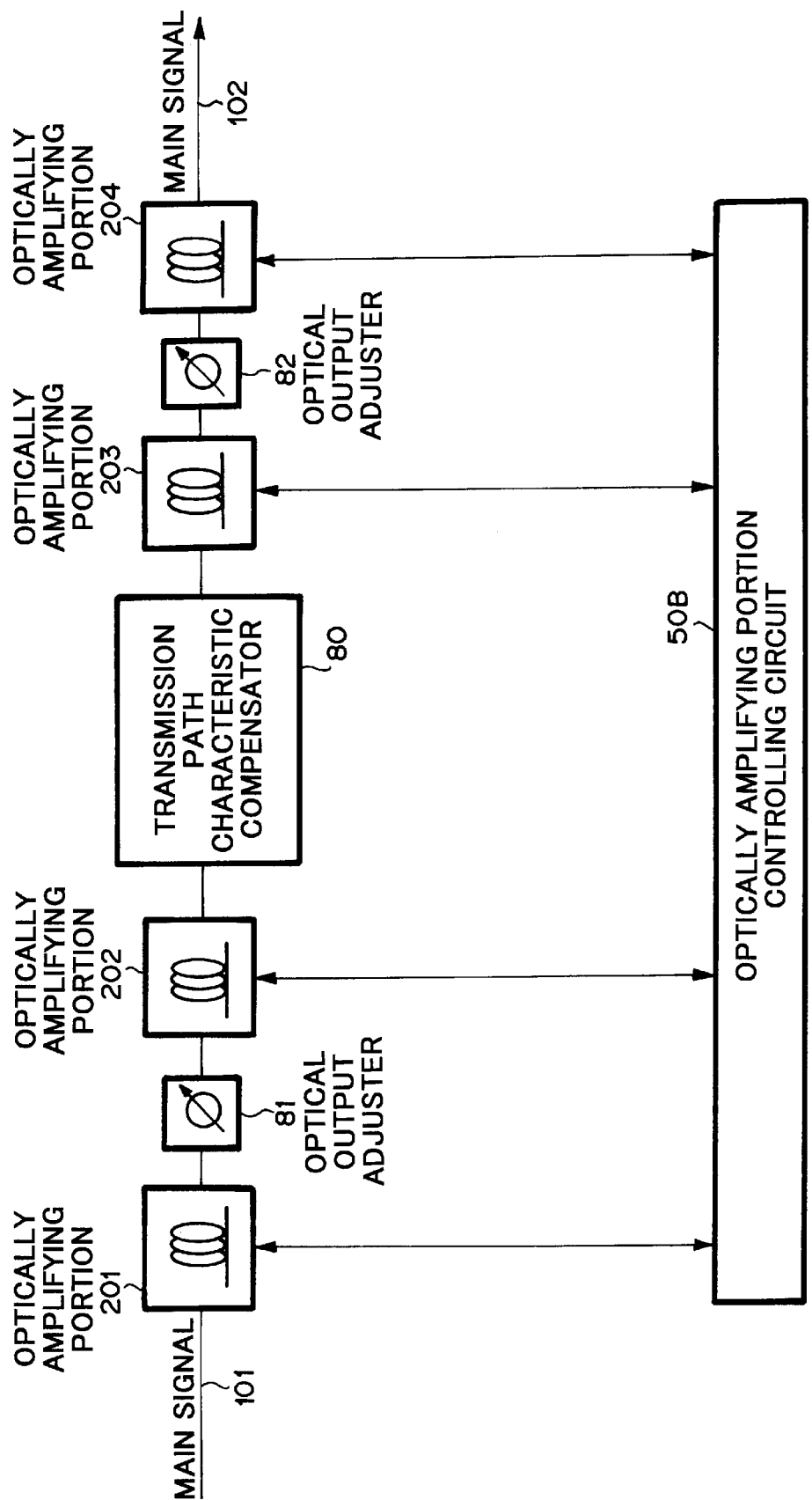

OPTICAL AMPLIFIER AND OPTICALLY AMPLIFYING METHOD

BACKGROUND OF THE INVENTION

1. Field of the Invention

The present invention relates to an optical amplifier and an optically amplifying method, and in particular, to those that are applicable for an optical amplification for use with an optical communication system and that have a bi-directional excitation light source.

2. Description of the Prior Art

Conventionally, an optical amplifier and an optically amplifing method are applied to for example an optical amplification for use with an optical communication system. Recently, as an explosive increase of the users of the Internet, it is necessary to drastically increase the transmission capacity of backbone transmission systems. As a means for increasing the transmission capacity effectively using the existing infrastructure, WDM (Wavelength Division Multiplexing), in particular, DWDM (Dense Wavelength Division Multiplexing) is becoming attractive. As a means for totally amplifying an optical signal that has been wavelength multiplexed, an optical amplifier and an optically amplifying method are becoming important.

FIG. 1 shows an example of the structure of a conventional optical amplifier. A part of an optical signal 901 that is input from a transmission path is branched to a photoelectrically converting device 933 by a directional coupler 921. The photoelectrically converting device 933 converts an output signal of the directional coupler 921 into an electric signal corresponding to the input power. A part of an output signal of an optically amplifying medium 920 is branched to a photoelectrically converting device 934 by a directional coupler 924. The photoelectrically converting device 934 converts an output signal of the directional coupler 924 into an electric signal corresponding to an output power to the transmission path.

A controlling circuit 950 controls the power of excitation light of a forward excitation light source 931 or a backward excitation light source 932 so that the output power to the transmission path becomes a predetermined power.

There are two types of excitations of an optically amplifying medium. One is a forward excitation in which the optically amplifying medium is excited from an input end and the other is a backward excitation in which the optically amplifying medium is excited from an output end. The forward excitation has an advantage of a high S/N ratio, whereas the backward excitation has an advantage of a high gain. In the conventional C band (1530 nm to 1565 nm), regardless of the forward excitation and the backward excitation, a desired gain can be obtained. However, as the number of wavelengths to be multiplexed increases, the L band (1570 nm to 1610 nm) has been used.

However, according to the prior art, since the L band requires a higher gain than the C band, when a desired gain is obtained with the backward excitation, a sufficient S/N ratio is not obtained. In contrast, when a desired S/N ratio is obtained with the forward excitation, a sufficient gain is not obtained.

SUMMARY OF THE INVENTION

Therefore, an object of the present invention is to provide an optical amplifier and an optically amplifying method that allows a higher S/N ratio and a high gain to be obtained.

According to a first aspect of the present invention, there is provided an optical amplifier, comprising: at least one optically amplifying unit having: a forward excitation light source for generating a forward excitation light; a forward excitation light coupler for coupling the forward excitation light with an input optical signal; an optically amplifying medium for amplifying the input optical signal combined with the forward excitation light; a backward excitation light source for generating a backward excitation light; a backward excitation light coupler for coupling the backward excitation light with the amplified optical signal; a first controller for controlling the forward excitation light source to generate the forward excitation light with a power up to a maximum power thereof; and a second controller for controlling the backward excitation light source to generate the backward excitation light in such a way that the backward excitation light compensates gain deficiency as compared with a desired gain of the optical amplifier.

In the optical amplifier, the first controller may control the forward excitation light source to generate the forward excitation light with the maximum power thereof.

In the optical amplifier, the optical amplifying unit may further comprise: a first directional coupler for deriving a first branch signal of the input optical signal; and a second directional coupler for deriving a second branch signal of the amplified optical signal, and the second controller may control the backward excitation light source on the basis of the first branch signal and the second branch signal.

In the optical amplifier, the optical amplifier may comprises a plurality of the optically amplifying unit connected in series.

The optical amplifier may further comprise: an optical output adjuster inserted between two of the optically amplifying units, wherein the optical output adjuster may adjust the level of the optical signal which passes therethrough.

The optical amplifier may further comprise: a transmission path characteristic compensator inserted between two of the optically amplifying units, wherein the transmission path characteristic compensator may compensate dispersion and/or gain of the optical signal which passes therethrough.

According to a second aspect of the present invention, there is provided an optically amplifying method, comprising the steps of: generating a forward excitation light; coupling the forward excitation light with an input optical signal; amplifying the input optical signal combined with the forward excitation light; generating a backward excitation light; coupling the backward excitation light with the amplified optical signal; controlling the forward excitation light to be generated with a power up to a maximum power thereof; and controlling the backward excitation light in such a way that the backward excitation light compensates gain deficiency as compared with a desired gain of the optical amplifier.

In the optically amplifying method, the forward excitation light may be controlled to be generated with the maximum power thereof.

The optically amplifying method may further comprise: deriving a first branch signal of the input optical signal; and deriving a second branch signal of the amplified optical signal, and wherein the backward excitation light source may be controlled on the basis of the first branch signal and the second branch signal.

These and other objects, features and advantages of the present invention will become more apparent in light of the following detailed description of the best mode embodiment thereof, as illustrated in the accompanying drawings.

BRIEF DESCRIPTION OF DRAWINGS

FIG. 6 is a block diagram showing an example of the structure of an optically amplifying portion according to a fourth embodiment of the present invention; and FIG. 7 is a block diagram showing an example of the structure of an optically amplifying portion according to a fifth embodiment of the present invention.

DESCRIPTION OF PREFERRED EMBODIMENTS

Next, with reference to FIGS. 2 to 7, optical amplifiers and optically amplifying methods according to embodiments of the present invention will be described.

(First Embodiment)

Figure 2:
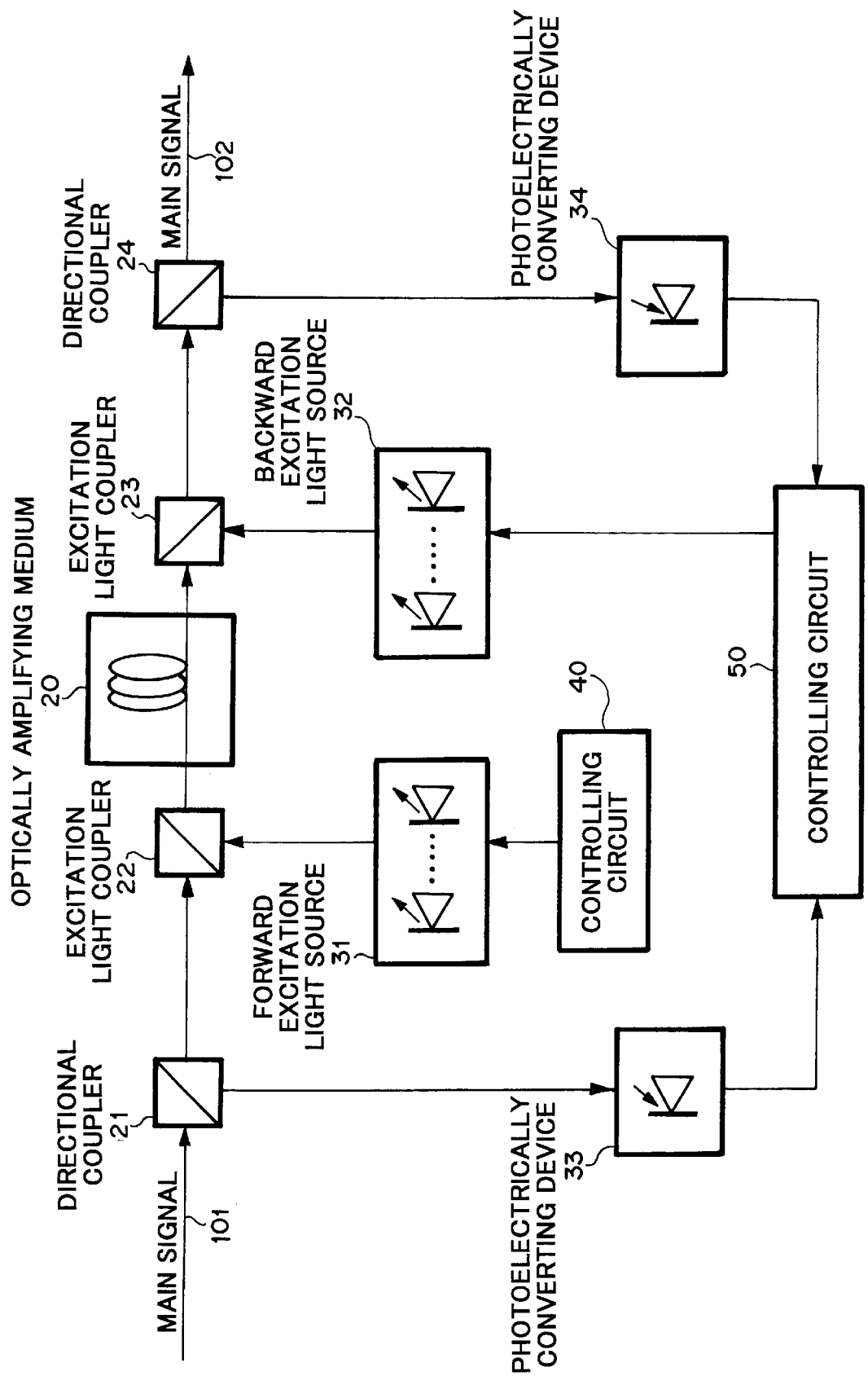
FIG. 2 is a block diagram showing the structure of an optical amplifier according to an embodiment of the present invention.

FIG. 2 shows an example of the structure of an optical amplifier according to a first embodiment of the present invention. The optical amplifier according to the first embodiment has directional couplers 21 and 24, excitation light coupler 22 and 23, an optically amplifying medium 20, a forward excitation light source 31, a backward excitation light source 32, photoelectrically converting devices 33 and 34, and controlling circuits 40 and 50. Main signals 101 and 102 are input and output signals of the optical amplifier.

The directional coupler 21 branches a part of the optical signal 101 that is input from a transmission path (not shown) to the photoelectrically converting device 33. The directional coupler 21 outputs the rest of the optical signal 101 to the excitation light coupler 22. The excitation light coupler 22 couples excitation light that is input from the forward excitation light source 31 with the optical signal 101 that is input from the directional coupler 21 and outputs the resultant signal to the optically amplifying medium 20. The optically amplifying medium 20 amplifies the optical signal that is input from the excitation light coupler 22. The excitation light coupler 23 is connected to an output terminal of the optically amplifying medium 20. The excitation light coupler 23 couples excitation light that is input from the backward excitation light source 32 with the amplified signal of the optically amplifying medium 20 and outputs the resultant signal to the output terminal of the optically amplifying medium 20.

The directional coupler 24 branches a part of the optical signal 101 that is input from the excitation light coupler 23 to the photoelectrically converting device 34. The directional coupler 24 outputs the rest of the optical signal 101 as the optical signal 102 to the transmission path (not shown).

The photoelectrically converting device 33 converts the optical signal branched by the directional coupler 21 into an electric signal. The photoelectrically converting device 34 converts the optical signal branched by the directional coupler 24 into an electric signal.

The forward excitation light source 31 is composed of one or a plurality of light sources. Likewise, the backward excitation light source 32 is composed of one or a plurality of light sources. The controlling circuit 40 controls the forward excitation light source 31 so that it generates light with the maximum power thereof. However, the controlling circuit 40 may control the forward excitation light source 31 so that it generates light with a power slightly less than the maximum power thereof or with a power which marginally satisfies a desired S/N ratio of the output optical signal.

The optically amplifying portion controlling circuit 50 compares an electric signal corresponding to an input power of the non-amplified optical signal that is input from the photoelectrically converting device 33 with an electric signal corresponding to an output power of an amplified optical signal that is output from the photoelectrically converting device 34. Corresponding to the compared result, the optically amplifying portion controlling circuit 50 controls the backward excitation light source 32 so that a predetermined gain and an output power to the transmission path are maintained.

(Example of Operation)

Next, with reference to FIG. 2, an example of the operation of the present invention will be described. An optical signal that is input from a transmission path (not shown) has been multiplexed in wavelength division.

A part of the optical signal 101 that is input from the transmission path (not shown) is branched to the photoelectrically converting device 33 by the directional coupler 21. The photoelectrically converting device 33 converts the optical signal into an electric signal corresponding to an input power of the non-amplified optical signal that is input from the directional coupler 21. The rest of the optical signal 101 is coupled with excitation light of the forward excitation light source 31 by the excitation light coupler 22 and supplied to the optically amplifying medium 20. The output signal of the optically amplifying medium 20 is coupled with excitation light of the backward excitation light source 32 by the excitation light coupler 23 and supplied to the output terminal of the optically amplifying medium 20.

A part of the optical signal amplified by the optically amplifying medium 20 is branched to the photoelectrically converting device 34 by the directional coupler 24. The rest of the main signal is output as the optical signal 102 to the transmission path (not shown).

The controlling circuit 40 controls the forward excitation light source 31 so that it generates light with the maximum power thereof, thereby gaining a desired S/N ratio. The controlling circuit 50 compares an electric signal corresponding to an input power of the non-amplified optical signal that is input from the photoelectrically converting device 33 with an electric signal corresponding to an output power of the amplified optical signal that is input from the photoelectrically converting device 34. Corresponding to the compared result, the controlling circuit 50 compensates the gain deficiency of the forward excitation light source 31 and controls the backward excitation light source 32 so that a predetermined gain of the optical amplifier, that is, ratio of the amplitude of the input optical signal and the amplitude of the output optical signal, and an output power to the transmission path are maintained.

(Effect)

Since the forward excitation light source and the backward excitation light source are controlled so that the output of the forward excitation light source that excites the optically amplifying medium is maximized and the gain deficiency is compensated by the backward excitation light source, the desired S/N ratio and the desired gain of the optical amplifier can be obtained.

(Second Embodiment)

According to a second embodiment of the present invention, a plurality of optically amplifying portions 201 to 204 are disposed, differently from the first embodiment. According to the second embodiment, when a desired gain cannot be obtained by one optically amplifying portion, the desired gain can be obtained by the plurality of optically amplifying portions.

Figure 3:
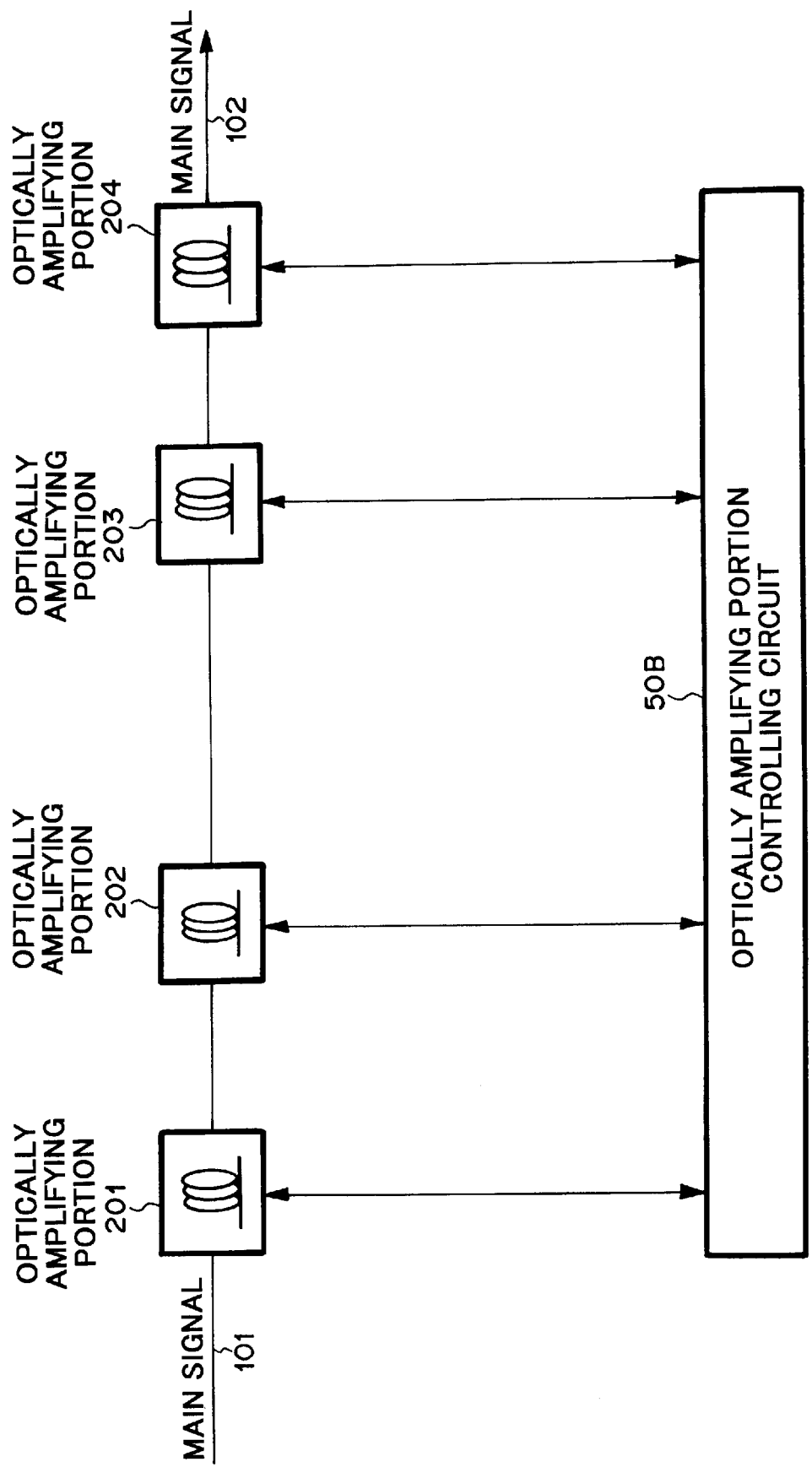
FIG. 3 is a block diagram showing the structure of an optical amplifier according to a second embodiment of the present invention.
Figure 4:
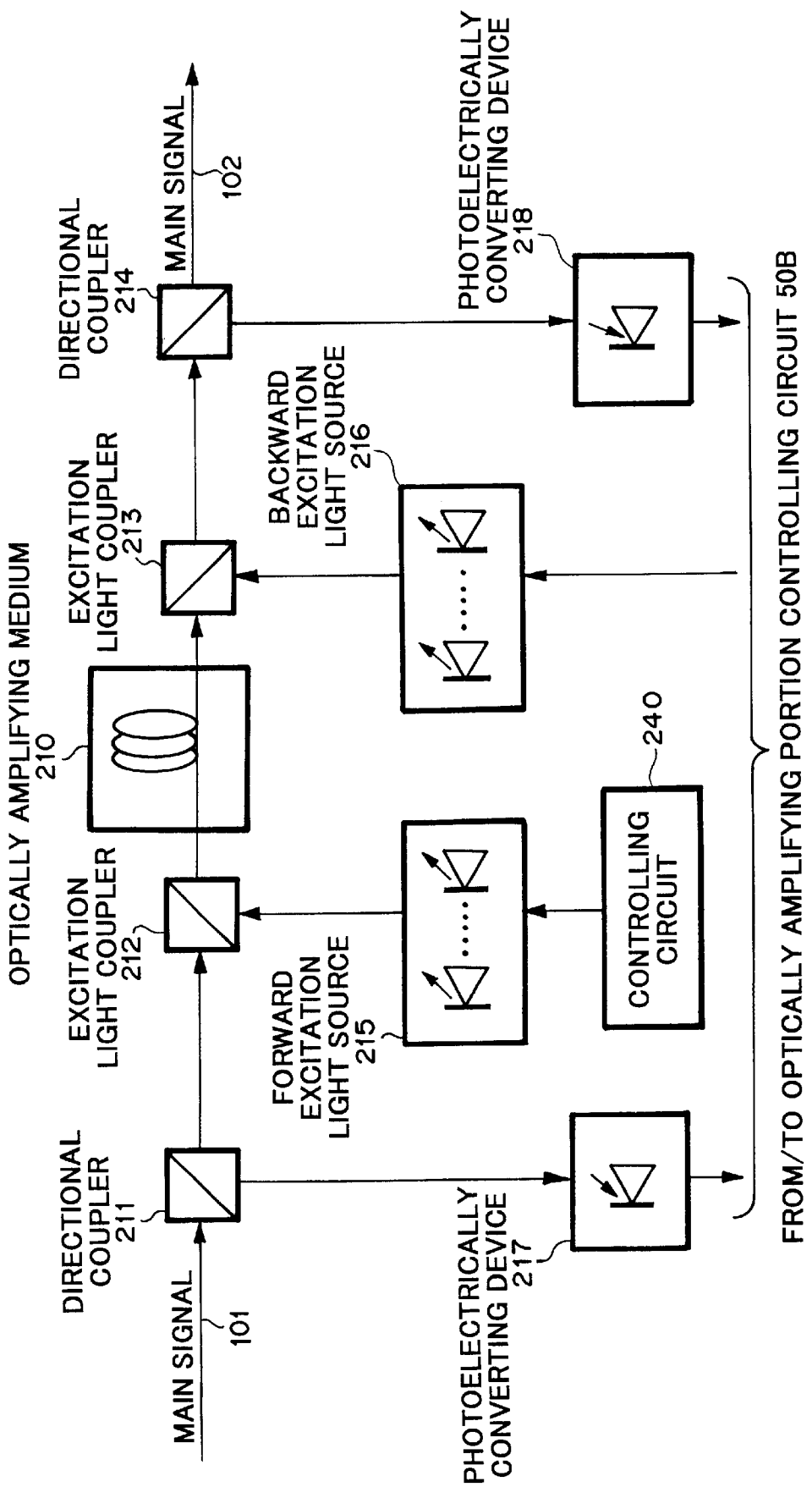
FIG. 4 is a block diagram showing an example of the structure of optically amplifying portions 201 to 204 according to the second embodiment of the present invention.

FIG. 3 is a block diagram showing an example of the combination of the optically amplifying portions 201 to 204. FIG. 4 is a block diagram showing an example of the structure of each of the optical amplifiers 201 to 204 according to the second embodiment.

Figure 1:
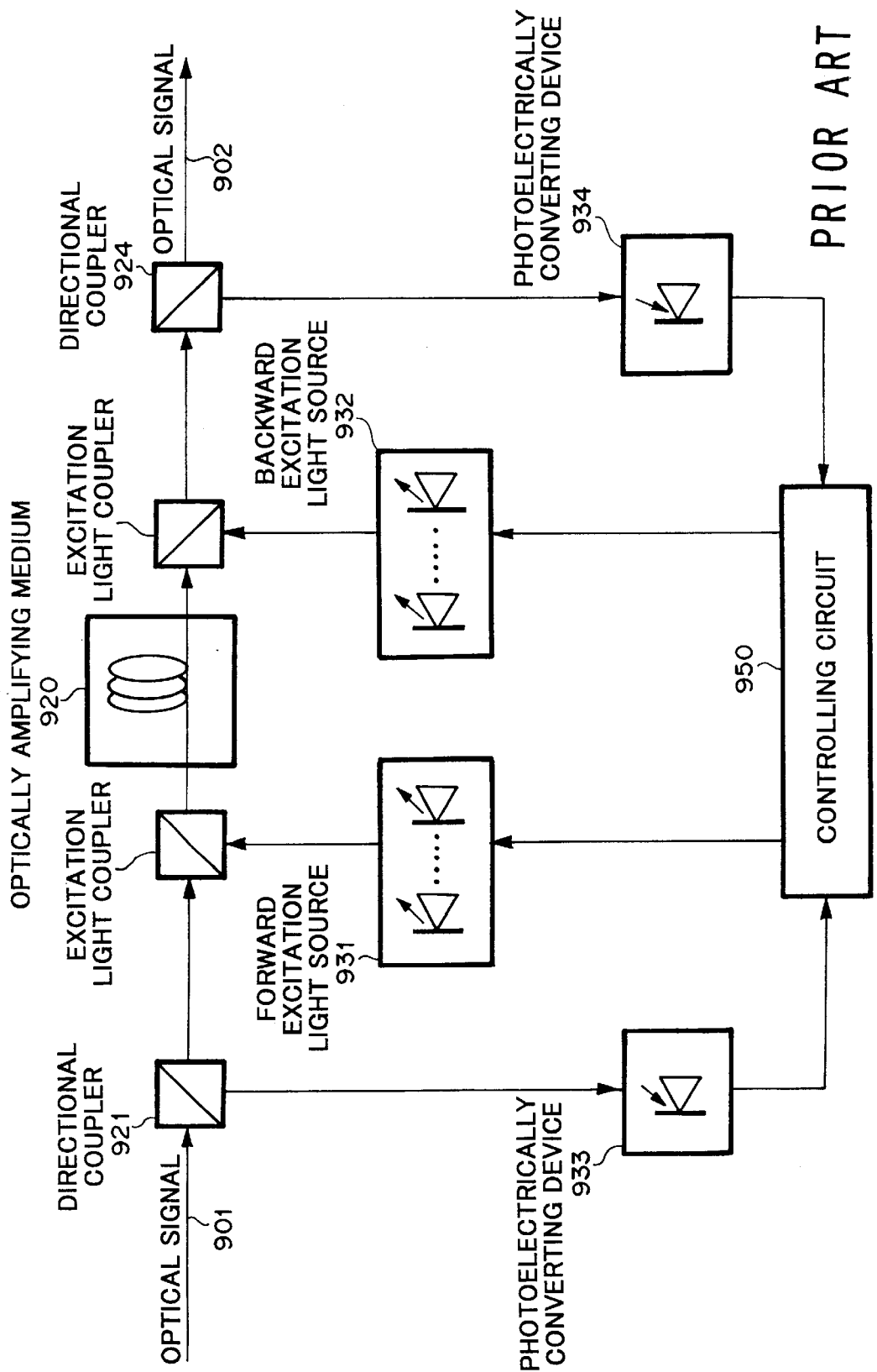
FIG. 1 is a block diagram showing the structure of a conventional optical amplifier.

Next, the relation of the structures of the structural portions according to the first embodiment shown in FIG. 1 and the second embodiment shown in FIGS. 3 and 4 will be described. According to the first embodiment and the second embodiment, the amplifying portion is composed of the directional coupler 21/211, the excitation light coupler 22/212, the excitation light coupler 23/213, the directional coupler 24/214, the optically amplifying medium 20/210, the forward excitation light source 31/215, the backward excitation light source 32/216, the photoelectrically converting device 33/217, the photoelectrically converting device 34/218, and the controlling circuit 40/240.

(Third Embodiment)

Figure 5:
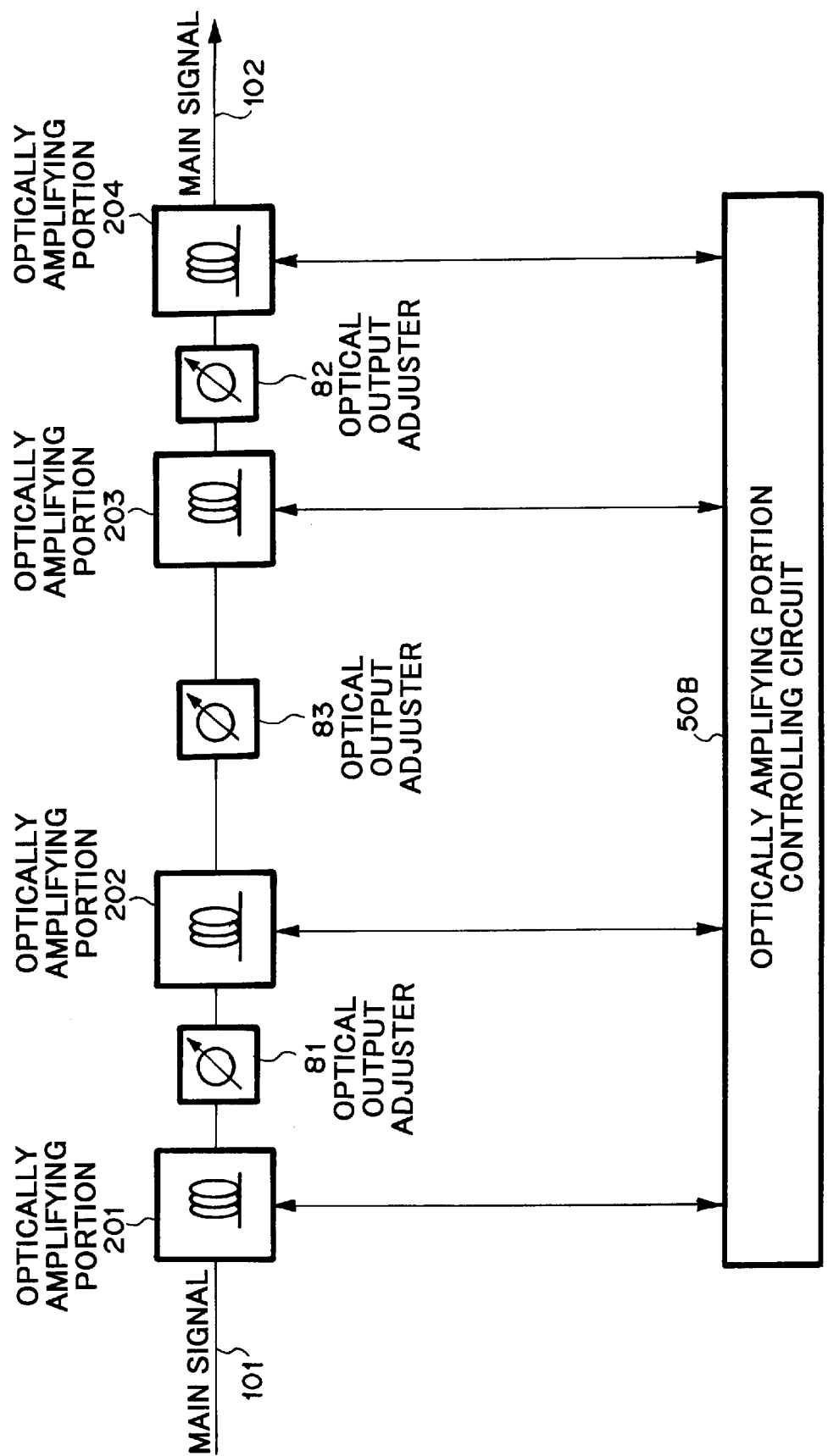
FIG. 5 is a block diagram showing an example of the structure of an optically amplifying portion according to a third embodiment of the present invention.

FIG. 5 is a block diagram showing an example of the structure of an optically amplifying portion according to a third embodiment of the present invention. In the structure of the third embodiment, an optical output adjuster 81, 82, 83 such as an optical fixed attenuator or an optical variable attenuator is added to the structure of the second embodiment. For example, when the optical output adjuster 81 is disposed between the optically amplifying portion 201 and the optically amplifying portion 202, the optical input level to the optically amplifying portion 202 can be adjusted for an optimum gain.

(Fourth Embodiment)

FIG. 6 is a block diagram showing an example of the structure of an optical amplifier according to a fourth embodiment of the present invention. In the structure of the fourth embodiment, a transmission path characteristic compensator 80 is added to the structure of the second embodiment.

The transmission path characteristic compensator 80 is for example a dispersion compensation fiber that compensates a dispersion characteristic of the transmission path and an equalizing filter that equalizes a gain characteristic of each wavelength of the transmission band. When the transmission path characteristic compensator 80 is disposed in the optical amplifier, the loss of the transmission path can be alleviated.

(Fifth Embodiment)

FIG. 7 is a block diagram showing an example of the structure of an optical amplifier according to a fifth embodiment of the present invention. The structure of the fifth embodiment is a combination of the structure of the third embodiment and the structure of the fourth embodiment. In an optical amplifier according to the fifth embodiment shown in FIG. 7, an optical signal is amplified at four stages of optically amplifying portions 201, 202, 203, and 204. An optical output adjuster 81 is disposed between the optically amplifying portions 201 and 202. In addition, an optical output adjuster 82 is disposed between the optically amplifying portions 203 and 204. A transmission path characteristic compensator 80 is disposed between the optically amplifying portions 202 and 203.

(Features)

In WDM and DWDM, for an optimum S/N ratio and a desired amplification factor, a bidirectional exciting system is used to allot respective gains in such a manner that an output of a forward excitation light source that excites an optically amplifying medium is maximized and the gain deficiency is compensated by a backward excitation light source.

As was described above, in the optical amplifier and optically amplifying method according to the present invention, a gain controlling function in which an output of a forward excitation light source is maximized for an amplification of an optical signal and the gain deficiency is compensated by a backward excitation light source is provided. Thus, an S/N ratio can be improved while realizing a desired gain.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. An optical amplifier, comprising:
   at least one optically amplifying unit having:
      a forward excitation light source for generating a forward excitation light;
      a forward excitation light coupler for coupling said forward excitation light with an input optical signal;
      an optically amplifying medium for amplifying said input optical signal combined with said forward excitation light;
      a backward excitation light source for generating a backward excitation light;
      a backward excitation light coupler for coupling said backward excitation light with the amplified optical signal;
      a first controller for controlling said forward excitation light source to generate said forward excitation light with a power up to a maximum power thereof; and
      a second controller for controlling said backward excitation light source to generate said backward excitation light in such a way that said backward excitation light compensates gain deficiency as compared with a desired gain of the optical amplifier.

2. The optical amplifier as set forth in claim 1, wherein said first controller controls said forward excitation light source to generate said forward excitation light with the maximum power thereof.

3. The optical amplifier as set forth in claim 1, wherein said optical amplifying unit further comprises:
   a first directional coupler for deriving a first branch signal of said input optical signal; and
   a second directional coupler for deriving a second branch signal of said amplified optical signal, and
   wherein said second controller controls said backward excitation light source on the basis of said first branch signal and said second branch signal.

4. The optical amplifier as set forth in claim 1, wherein the optical amplifier comprises a plurality of said optically amplifying unit connected in series.

5. The optical amplifier as set forth in claim 4, further comprising:

an optical output adjuster inserted between two of said optically amplifying units, wherein said optical output adjuster adjusts the level of the optical signal which passes therethrough.

6. The optical amplifier as set forth in claim 4, further comprising:

a transmission path characteristic compensator inserted between two of said optically amplifying units, wherein said transmission path characteristic compensator compensates dispersion and/or gain of the optical signal which passes therethrough.

7. An optically amplifying method, comprising the steps of:

generating a forward excitation light;

coupling said forward excitation light with an input optical signal;

amplifying said input optical signal combined with said forward excitation light;

generating a backward excitation light;

coupling said backward excitation light with the amplified optical signal;

controlling said forward excitation light to be generated with a power up to a maximum power thereof; and controlling said backward excitation light in such a way that said backward excitation light compensates gain deficiency as compared with a desired gain of the optical amplifier.

8. The optically amplifying method as set forth in claim 7, wherein said forward excitation light is controlled to be generated with the maximum power thereof.

9. The optically amplifying method as set forth in claim 7, further comprising the steps of:

deriving a first branch signal of said input optical signal; and deriving a second branch signal of said amplified optical signal, and wherein said backward excitation light source is controlled on the basis of said first branch signal and said second branch signal.

* * * * *